United States Patent
Logvinov et al.

(10) Patent No.: US 7,809,452 B2
(45) Date of Patent: Oct. 5, 2010

(54) DELAY MANAGEMENT OF PRESENTATION OUTPUT SYSTEM AND METHOD

(75) Inventors: Oleg Logvinov, East Brunswick, NJ (US); Michael Macaluso, Highland Park, NJ (US); Brion Ebert, Easton, PA (US)

(73) Assignees: Leviton Manufacturing Co., Inc., Little Neck, NY (US); Arkados, Inc., North Plainfield, NJ (US)

( * ) Notice: Subject to any disclaimer, the term of this patent is extended or adjusted under 35 U.S.C. 154(b) by 1253 days.

(21) Appl. No.: 11/361,701

(22) Filed: Feb. 23, 2006

(65) Prior Publication Data

US 2006/0242314 A1   Oct. 26, 2006

Related U.S. Application Data

(60) Provisional application No. 60/655,859, filed on Feb. 23, 2005.

(51) Int. Cl.
*G06F 17/00* (2006.01)
*H04N 9/475* (2006.01)
*H04N 5/91* (2006.01)

(52) U.S. Cl. .................. 700/94; 348/515; 348/518; 386/66

(58) Field of Classification Search .............. 700/94; 348/425.4, 500, 515, 516, 518; 386/66
See application file for complete search history.

(56) References Cited

U.S. PATENT DOCUMENTS

| 5,570,372 | A  | * | 10/1996 | Shaffer ....................... 348/515 |
| 7,657,829 | B2 | * | 2/2010  | Panabaker et al. .......... 715/203 |
| 2003/0142232 | A1 | * | 7/2003 | Albean ........................ 348/512 |
| 2005/0015805 | A1 | * | 1/2005 | Iwamura ...................... 725/79 |
| 2005/0138666 | A1 | * | 6/2005 | Narusawa et al. ............ 725/89 |

* cited by examiner

*Primary Examiner*—Curtis Kuntz
*Assistant Examiner*—Jesse A Elbin
(74) *Attorney, Agent, or Firm*—Davis Wright Tremaine LLP; George C. Rondeau, Jr.; Heather M. Colburn

(57) ABSTRACT

A system and method of delivering synchronized audio and audio/video signals in the form of analog signals and streamed data over networks such a hybrid power line communications network is described. Signal magnitude matching by monitoring directly feed audio outputs is also provided.

7 Claims, 4 Drawing Sheets

DELAY MANAGEMENT OF PRESENTATION OUTPUT SYSTEM AND METHOD

FIELD OF THE INVENTION

This invention relates to the field of data transmission over a hybrid, shared media such as conventional electric power conveying media.

BACKGROUND OF THE INVENTION

In many of today's home and small office multimedia networks, there often exists a variety of possible multimedia sources, such as discrete input and output audio/video or consumer electronics devices, along with possible streaming sources from a personal computer, a cable or DSL modem, or some other multimedia device that is connected to an ad-hoc, packet based network such as Ethernet or USB. There are many applications where it is desirable to set up a multimedia network or networks throughout a home or small office that can accomplish multimedia distribution and synchronization applications. One possible application could be the ability to send a multimedia stream from an internet source through an existing audio/video system, where there may be one or more speakers that are not directly connected, but may be connected through a powerline communication (PLC) network, such as with rear speaker extension applications. Other possible applications could distribute synchronized audio signals to one or more pair of remote speakers, or to speakers located through a home or small office for a whole house/office audio system.

It would be desirable to deliver multimedia content within the housing structures (residential and commercial) while minimizing the latency and improving the reliability of such delivery. It is also helpful to minimize the cost of the installation as well as assure that the performance of the multimedia content delivery platforms is independent from the location within the building structure. It would be further desirable to synchronize the streamed multimedia content to ensure the timely delivery of data when multiple types of networks are used for transport. Conventional powerline communication technologies have made progress with ease of installation and predictability of coverage. Unfortunately, requirements related to media synchronization are still unanswered.

DETAILED DESCRIPTION OF THE INVENTION

Figure 1:
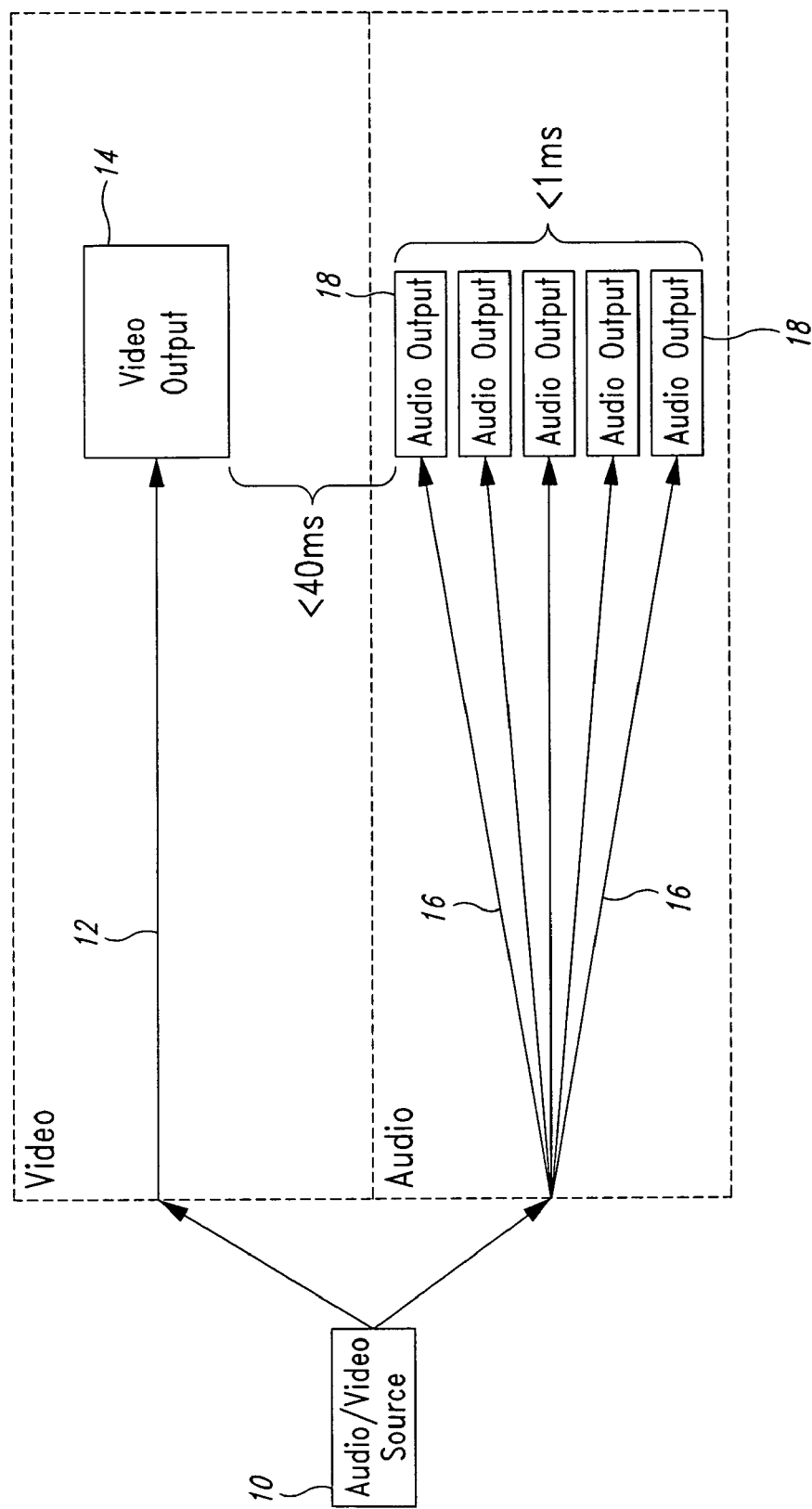
FIG. 1 is a schematic showing allowable delay tolerances between various portions of an exemplary multimedia data stream.

A delay management system for presentation output is discussed herein to provide effective degrees of synchronization of audio output or audio/video output streamed to multiple destinations across ad-hoc, varying-bandwidth networks, such as hybrid power line communications ("PLC") networks combined with hard-wired or wireless direct audio feeds or direct audio-video feeds. Presentation delays for streamed content to various output devices due to network delivery characteristics are coordinated alone or in combination with presentation delays to other various output devices due to characteristics of hard-wired or wireless direct feeds.

The delay management system addresses situations occurring with multimedia data streams, for instance, where video to audio synchronization is not nearly as critical as audio speaker-to-speaker synchronization. The delay management system uses data flow prioritization to maintain a closer tolerance for audio-audio synchronization between a plurality of audio presentation outputs by allowing a more relaxed tolerance for audio-video synchronization between a plurality of audio outputs and one or more video outputs.

The delay management system further includes delay buffering to coordinate various delays resulting from packetization, PLC transmission, reception, and reconstitution. The delay buffering normalizes network induced delays and/or delays with hard-wired or wireless direct feeds with the various levels of synchronization to multiple presentation outputs.

The delay management system uses level detection to balance volume levels of networked audio outputs with directly fed audio outputs by monitoring source levels for the directly fed audio outputs. Level detection is performed by the delay management system either in the digital domain or in the analog domain. Furthermore, level detection in the analog domain allows direct feed amplifiers (such as with home theater amplifiers) directly feeding the hard-wired or wireless audio outputs to control volume levels of the networked audio outputs (such as with extended rear speakers) through an interface of the direct feed amplifier.

When dealing with the distribution or streaming of multimedia content over non-conventional network mediums, where different portions of the stream will be routed to different physical end points, it is helpful to determine an amount of tolerance that is acceptable between the data streams that would not manifest as observable distractions. Consider the application of rear speaker extension using a powerline network to transport data to the rear speakers in a home theater environment. Undesirable audio manifestations can be produced if synchronization between audio signals for various audio outputs is not sufficiently precise in an audible range. Further consideration includes synchronization between audio track and an accompanying video track to accomplish such degrees of presentation quality as lip syncing. Generally for many various forms of presentations audio-video synchronization is less demanding than audio-audio synchronization.

Components of an audio/video source 10 are shown in FIG. 1 broken into an associated dedicated video stream 12 being presented by a video output 14 and audio streams 16 being presented by respective audio outputs 18. For example, for a typical observer an acceptable amount of delay between the video output 14 and the plurality of audio outputs 18 would be maintained under 40 ms, and an acceptable amount of delay amongst the plurality of audio outputs would be maintained under 1 ms. In general accordance with this particular example, the delay management system maintains a more demanding requirement for audio-audio synchronization by maintaining a less demanding requirement for audio-video synchronization. Selective prioritization for delivery of packets to various output devices along with packet length selection is used to achieve more demanding tolerances where required. For example, gaps in transmission of video data packets can be filled in with multiple audio channel packets of small length to maintain demanding delay tolerances for audio outputs without otherwise requiring additional transmission bandwidth.

To distribute synchronized, real time data to multiple presentation outputs existing on different distribution paths including direct feeds and hybrid networks, the delay management system serves as a focal point for audio/video streams to separate them into their respective channels while maintaining desired delay tolerances for synchronization purposes. The delay management system serves in part as a media delay buffer to equalize transmission delays resulting from the packetization, transmission over the PLC network, reception and reconstitution.

Figure 2:
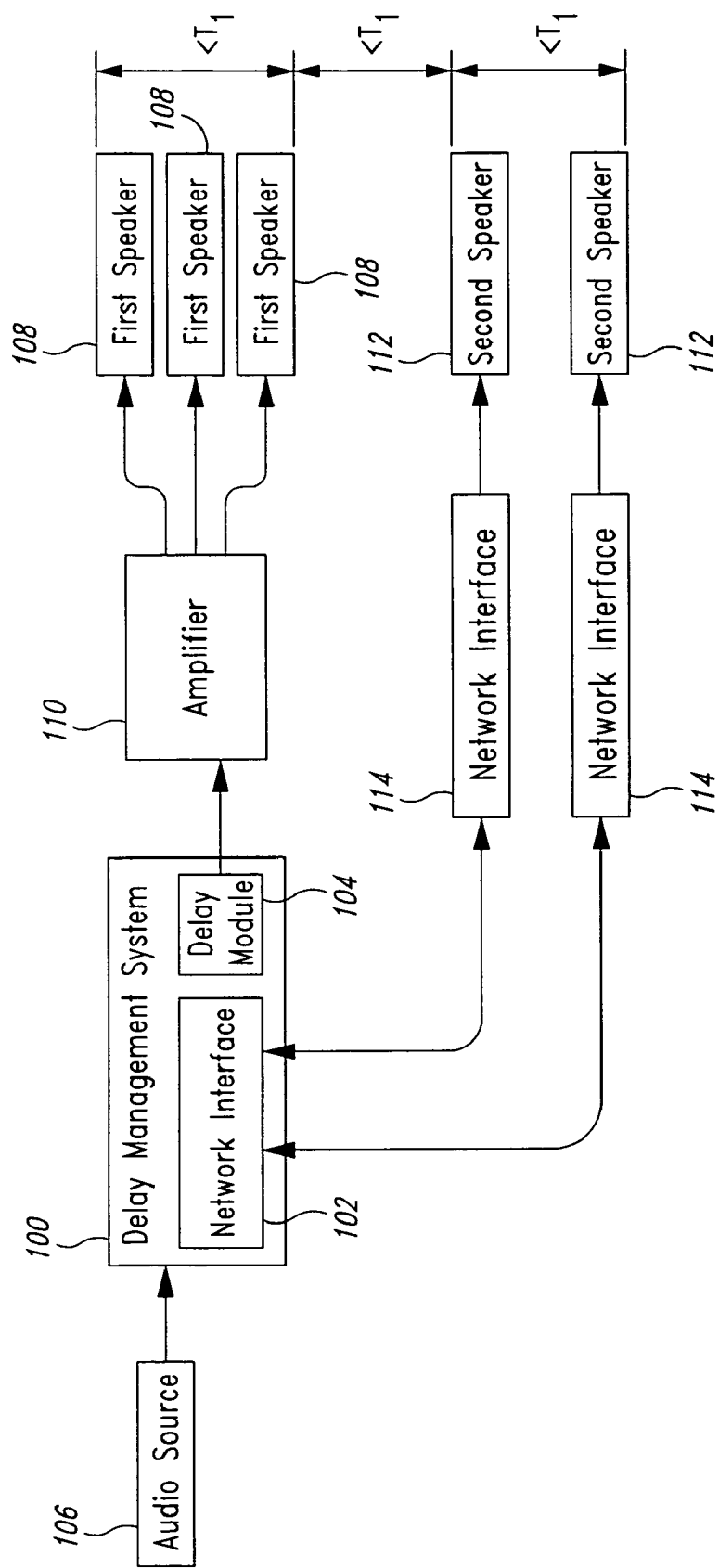
FIG. 2 is a schematic diagram of a first implementation of delay management system.

A first implementation 100 of the delay management system is shown in FIG. 2 to include a network interface 102 and a delay module 104. The first implementation 100 is shown to normalize delay regarding audio and video signals received from an audio/video source 106 and transmitted to audio outputs in the form of first speakers 108 directly fed through amplifier 110 and to second speakers 112 networked through network interfaces 114 to the network interface 102 of the first implementation.

As shown, the first implementation 100 maintains a synchronization discrepancy of audio signal delivery to audio outputs of less than T1 both amongst the second speakers 112, and between the first speakers 108 and the second speakers 112. In this example, the first speakers 108 are all spaced from the amplifier 110 appropriate distances so that a synchronization discrepancy of less than T1 amongst the first speakers can also be maintained. In a typical situation, T1 could be approximately 1 ms, but may vary depending upon characteristics of observers and observation environment involved.

In general, the delay management system can create substantially equal delay for all related audio and video streams as it exists in the MAC/PHY-MAC/PHY channel. The first implementation 100 will communicate through the network interface 102 to the network interfaces 114 and on to the second speakers 112 to determine the network delay to each of the second speakers. The first implementation 100 then determines a proper packet transmission procedure to the networked second speakers 112 through the network interface 102 and delays data transmission through the delay module 104 to the first speakers 108 to maintain proper synchronization amongst the second speakers and between the first speakers and the second speakers.

Figure 3:
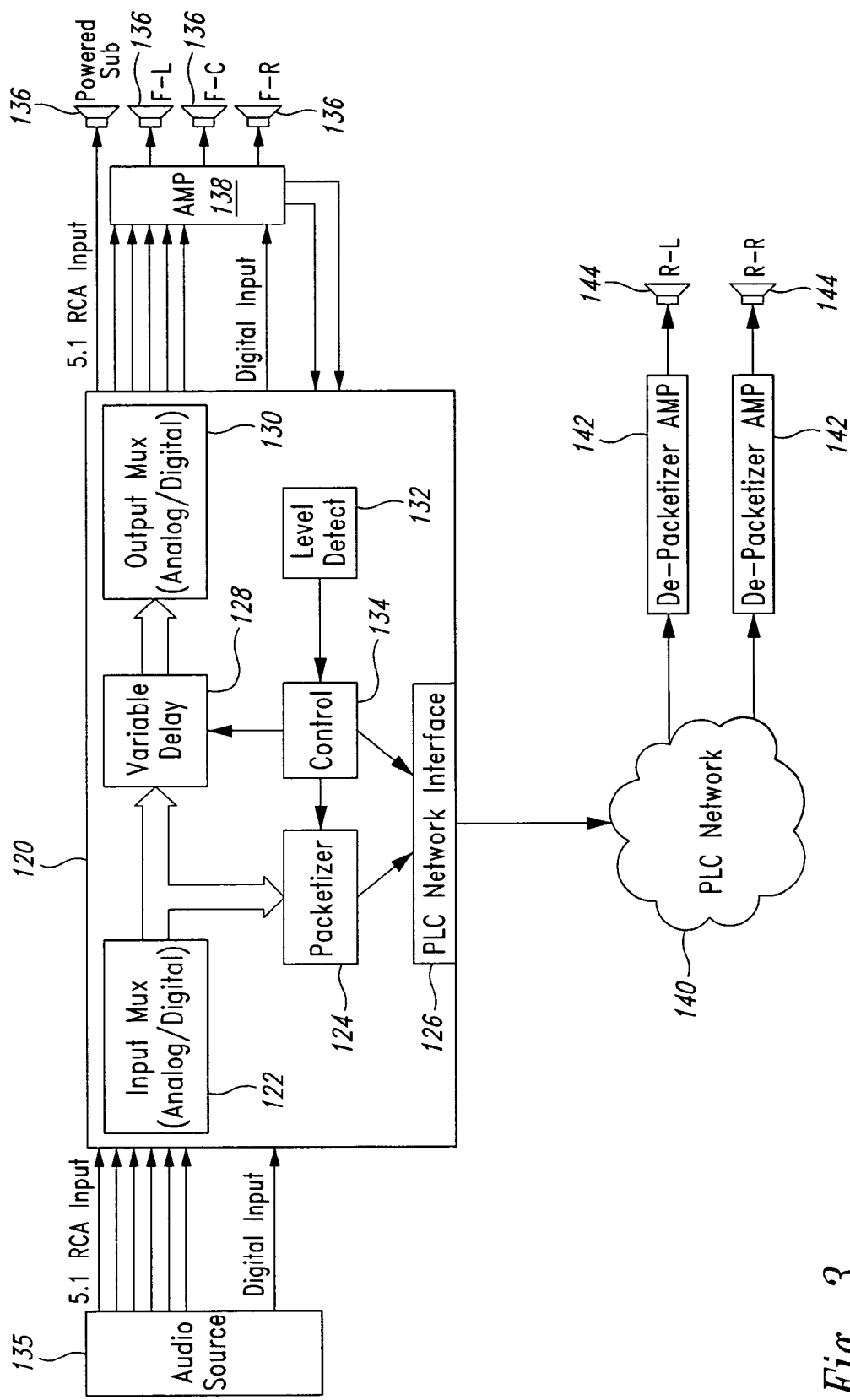
FIG. 3 is a schematic diagram of a second implementation of the delay management system with magnitude leveling.

A second implementation of the delay management system 120 is shown in FIG. 3 to include an input mux 122, a packetizer 124, a network interface 126, a variable delay 128, an output mux 130, a level detect 132, and a control 134. The input mux 122 receives audio signals from an audio source 135 to be sent to the packetizer 124, and the variable delay 128. The variable delay 128 adjusts signal delay and sends the audio signals on to audio outputs as first speakers 136 through an amplifier 138. The packetizer 124 packetizes the audio signals to be sent to a PLC network 140 through the network interface 126 with appropriate delay adjustment and on through de-packetizer amplifiers 142 to other audio outputs as second speakers 144. The control 134 controls the packetizer 124, and the network interface 126, and the variable delay 128 for the above to be accomplished.

Furthermore, the control 134 receives information from the level detect 132 gathered from the amplifier 138 to determine proper signal magnitude for the first speakers 136 compared to the second speakers 144. This level detection can be done in either the digital domain or in the analog domain. As shown in FIG. 3, level detection in the analog domain provides the additional benefit of allowing the amplifier 138 (e.g. as a home theater amplifier) to control the level of the second speakers 144 (e.g. as extended rear speakers) through an interface.

The second implementation 120 determines audio signal level to the first speakers 136 and transmits this information through the PLC network 140 to the de-packetizer amplifiers 142, which will then in turn adjust signal levels to the second speakers 144 to match signal levels to the first speakers 136. The second implementation also performs delay determination and synchronization functionality to maintain proper synchronization across all audio outputs as the first speakers 136 and the second speakers 144.

Figure 4:
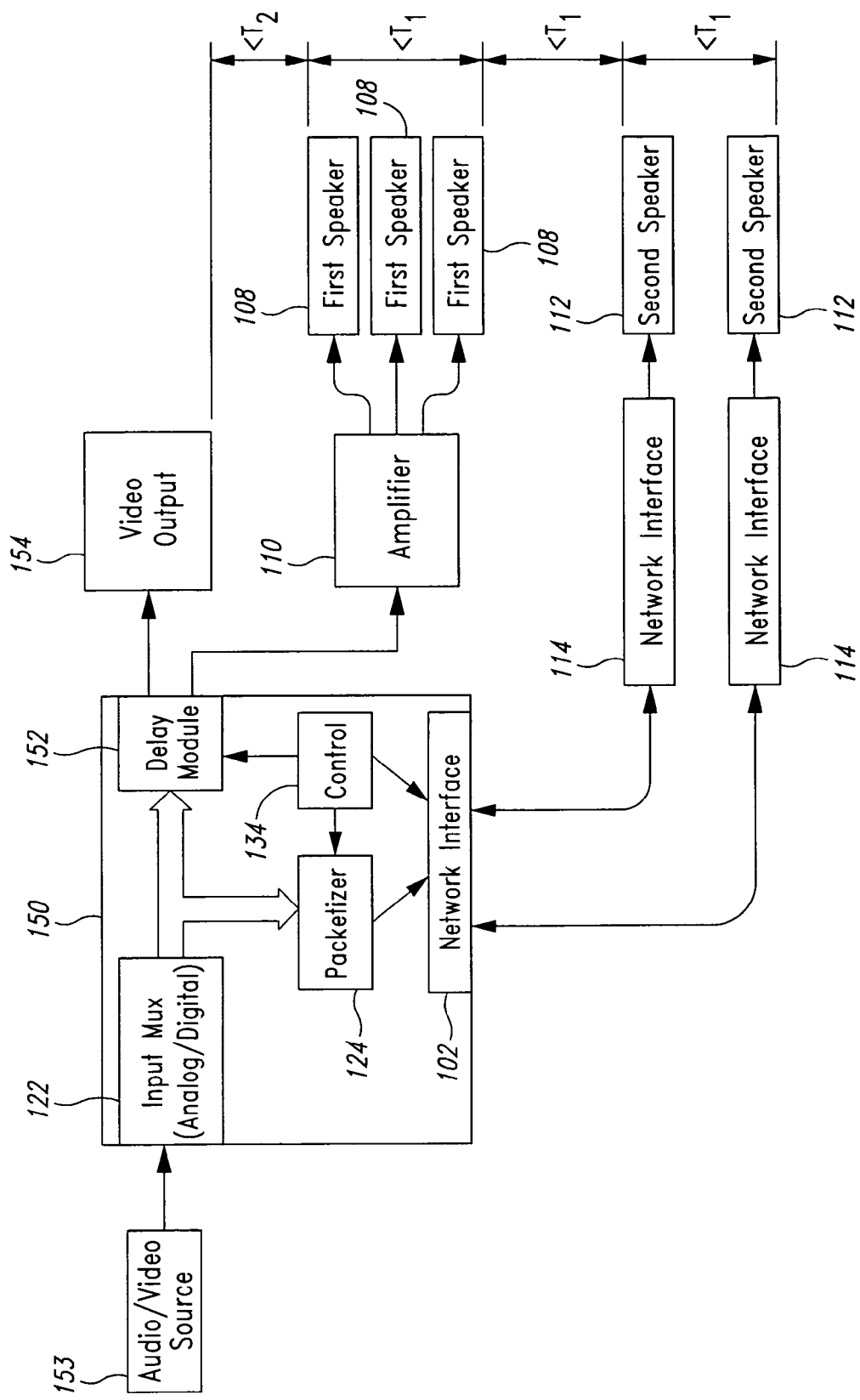
FIG. 4 is a schematic diagram of a third implementation of the delay management system.

A third implementation 150 is shown in FIG. 4 to include delay management by a delay module 152 of video signals received from an audio/visual source 153 and sent to a video output 154 such as a television, monitor, projector or other such video output. The third implementation 150 manages transmission delay such that audio synchronization discrepancies amongst the first speakers 108, the second speakers, and the first speakers and the second speakers 112 are maintained as described above. In addition, the third implementation 150 further manages transmission delay by the delay module 152 such that a second synchronization discrepancy of less than T2 between video presentation on the video output 154 and audio presentation by the first speakers 108 and the second speakers 112 is maintained. In a typical situation, T2 could be approximately 40 ms, but may vary depending upon characteristics of observers and observation environment involved.

Although preferred embodiments of the present invention have been described and illustrated, it will be apparent to those skilled in the art that various modifications may be made without departing from the principles of the invention. For instance, some implementations of the delay management system can be used for multimedia content distribution where content is comprised of a plurality of the related components and where some of the components are distributed or transmitted through commonly known analog interfaces and interconnects while the rest of content components is distributed or transmitted via digital interfaces and interconnects in a packetized form.

Other implementations use a method of managing bandwidth allocation on the network through a distributed software layer that communicates through management channels using TCP/IP protocols. Further implementations allow for reuse of components in MAC/PHY to minimize cost. Other implementations employ other methods of content stream synchronization based on application of equalization delays.

Further implementations manage presentation time of real-time content distributed over networks with unequal QoS mechanisms, latencies, and delivery reliability. Additional implementations detect input signal level from digital source data for purposes of automatic gain control on reconstituted output.

Other implementations detect level of an input signal from an analog input (such as the speaker outputs of a typical audio/video receiver) for purposes of automatic gain control on the reconstituted output. Some implementations gather additional information about a multimedia stream by such methods as signal level detection. Additional methods manage stream control information through a software layer that communicates using a conventional TCP/IP stack.

Further implementations synchronize a multimedia content stream signal, emanating from at least one multimedia source, for play through a plurality of output devices, wherein the output devices are connected to the multimedia source by wired connections and wireless connections; the system including plural output realms, including wired realms and wireless realms; and which includes delay synchronizers and for determining a buffer delay for streaming the multimedia content stream signal from a buffer to an output device. A method of synchronizing a multimedia content stream for output to a plurality of wired and wireless output devices in a network having plural realms, wherein each realm includes a CTL, includes buffering the multimedia content stream in a first realm; determining a buffer delay; transmitting the buffer delay to all CTLs in all realms of the network; and transmitting the multimedia content stream to all realms in the network.

The invention claimed is:

1. A system for an audio/video source, first directly fed audio outputs, and second networked audio outputs, the system comprising:
   a control;
   a packetizer;
   a network interface configured to operate with the control and packetizer to send an audio signal received from the audio/video source to the second networked audio outputs with a first delay adjustment; and
   a delay module configured to send the audio signal to the first directly fed audio outputs with a second delay adjustment, the delay module configured to send a video signal received from the audio/video source to the video output with a third delay adjustment, the first delay adjustment, second delay adjustment, and third delay adjustment provided whereby synchronization discrepancy between audio presentation by the first audio output and audio presentation by the second audio output is less than a first time period and synchronization discrepancy between video presentation by the video output and audio presentations by the first audio outputs and the second audio outputs is less than a second time period, the first time period being less than the second time period.

2. The system of claim 1, wherein the delay module is further configured to determine network delay to each of the second networked audio outputs and based at least in part on the network delays to each of the second networked audio outputs, determine the second delay adjustment.

3. The system of claim 1, further comprising:
   a level detector configured to determine audio signal levels to the first directly fed audio outputs and adjust audio signal levels to the second networked audio outputs to match audio signal levels to the first directly fed audio outputs.

4. The system of claim 1, wherein the second time period is less than approximately 40 ms, and the first time period is less than approximately 1 ms.

5. A method comprising:
   receiving a first video signal from an audio/video source;
   sending a first audio signal based on the first video signal to a networked audio output, the first audio signal having a first delay adjustment;
   sending a second audio signal based on the first video signal to a directly fed audio output, the second audio signal having a second delay adjustment;
   sending a second video signal based on the first video signal to a video output, the second video signal having a third delay adjustment;
   determining the first and second delay adjustments such that a synchronization discrepancy between audio presentation by the networked audio output and audio presentation by the directly fed audio output is less than a first time period; and
   determining the first, second, and third delay adjustments such that a synchronization discrepancy between video presentation by the video output and audio presentations by the networked audio output and the directly fed audio output is less than a second time period, the first time period being less than the second time period.

6. The method of claim 5, further comprising:
   determining a network delay to the networked audio output; and
   based at least in part on the network delay to the networked audio output, determining the second delay adjustment.

7. The method of claim 2, further comprising:
   determining an audio signal level to the directly fed audio output; and
   adjusting an audio signal level to the networked audio output to match the audio signal level to the directly fed audio output.

* * * * *